US007849303B2

(12) United States Patent
Miller

(10) Patent No.: US 7,849,303 B2
(45) Date of Patent: Dec. 7, 2010

(54) PEER-TO-PEER NETWORK INFORMATION STORAGE

(75) Inventor: John L. Miller, Cabridge (GB)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 11/063,769

(22) Filed: Feb. 22, 2005

(65) Prior Publication Data

US 2006/0190716 A1    Aug. 24, 2006

(51) Int. Cl.
*H06L 29/06* (2006.01)
(52) U.S. Cl. ..................... 713/150; 713/168
(58) Field of Classification Search .................. 713/150
See application file for complete search history.

(56) References Cited

U.S. PATENT DOCUMENTS

| | | | | |
|---|---|---|---|---|
| 5,832,195 | A * | 11/1998 | Braun et al. | 714/2 |
| 5,922,074 | A * | 7/1999 | Richard et al. | 726/21 |
| 6,061,794 | A * | 5/2000 | Angelo et al. | 726/3 |
| 6,367,009 | B1 * | 4/2002 | Davis et al. | 713/166 |
| 6,496,932 | B1 * | 12/2002 | Trieger | 713/168 |
| 2004/0064568 | A1 | 4/2004 | Arora et al. | |
| 2004/0249972 | A1 * | 12/2004 | White et al. | 709/243 |
| 2006/0190715 | A1 | 8/2006 | Miller | |
| 2006/0191020 | A1 | 8/2006 | Miller | |

OTHER PUBLICATIONS

Y. Xie et al., "Protecting Privacy in Key -Value Search Systems," technical report CMU-CS-03-158, Jul. 2003.*

Judge P. et al., "Citadel: a content protection architecture for decentralized peer-to-peer file sharing systems," Globecom 03', IEEE Global Telecommunications Conference (IEEE CAT. No. 03CH37489), 2003, vol. 3, pp. 1496-1500.*

D. Bindel et al. "OceanStore: An Extremely Wide-Area Storage System," Reprot No. UCB/SCD-00-1102, Mar. 1999, Computer Science Divison (EECS), University of California, Berkeley.*

Y. Xie et al., "Protecting Privacy in Key—Value Search Systems," technical report CMU—CS—03—158, Jul. 2003.*

Judge P. et al., "Citadel a content protection architecture for decentralized peer—to—peer file sharing system," Globecom 03', IEEE Global Telecommunications (IEEE CAT. No. 03CH37489), 2003, vol. 3, pp. 1496-1500.*

(Continued)

*Primary Examiner*—Farid Homayounmehr
*Assistant Examiner*—Dant B Shaifer Harriman
(74) *Attorney, Agent, or Firm*—L. Alan Collins; Collins & Collins Incorporated

(57) ABSTRACT

In a typical peer-to-peer network, any user of the peer-to-peer network may request a lookup of a key and its associated value. To limit access to a stored key-value pair, a user node may register a key-value pair in a peer-to-peer network associated with an access list listing those user nodes which are authorized to access the key-value pair. The access list may include one or more retrieval identifiers. To further secure the information, the retrieval identifiers and/or the payload may be encrypted. To allow the retrieving user to decrypt an encrypted payload, the payload may be encrypted using a group key associated with the stored key-value pair. The group key may be encrypted using a key known to the retrieving user.

21 Claims, 8 Drawing Sheets

OTHER PUBLICATIONS

D. Bindel et al. "OceanStore: An Extremely Wide—Area Storage System," Report No. UCB/SCD-00-1102, Mar. 1999, Computer Science Division (EECS), University of California, Berkeley.*

Y. Xie et al., "Protecting Privacy in Key-Value Search Systems,"Technical report CMU—CS—03—158, Jul. 2003.*

Judge P. et al., "Citadel: a content protection architecture for decentralized peer to peer file sharing systems," Globecom 03,' IEEE Global Telecommunications Conference (IEEE CAT. No. 03CH37489), 2003, vol. 3, pp. 1496-1500.*

D. Bindel et al. "Ocean Store: An Extremely Wide Area—Storage System," Report No. UCB/SCD-00-1102, Mar. 1999, Computer Science Division(EECS), University of California, Berkeley.*

European Patent Office "European Search Report" for European Patent Application No. 06 110 219.0, Jun. 28, 2006, Munich.

Y. Xie et al., "Protecting Privacy in Key-Value Search Systems", technical report CMU-CS-03-158, Jul. 2003.

M. Amnefelt et al., "Keso—A scalable, reliable and secure read/write peer-to-peer file system", Degree Project Report, May 25, 2004.

Sandhu R.S., "Role-Based Access Control Models", Computer, IEEE Service Center, Feb. 1996, vol. 29, No. 2, pp. 38-47.

Judge P. et al., "Citadel: a content protection architecture for decentralized peer-to-peer file sharing systems", Globecom'03, IEEE Global Telecommunications Conference (IEEE CAT. No. 03CH37489), 2003, vol. 3, pp. 1496-1500.

D. Bindel et al., "OceanStore: An Extremely Wide-Area Storage System", Report No. UCB/SCD-00-1102, Mar. 1999, Computer Science Division (EECS), University of California, Berkeley.

* cited by examiner

PEER-TO-PEER NETWORK INFORMATION STORAGE

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary Operating Environment

Figure 1:
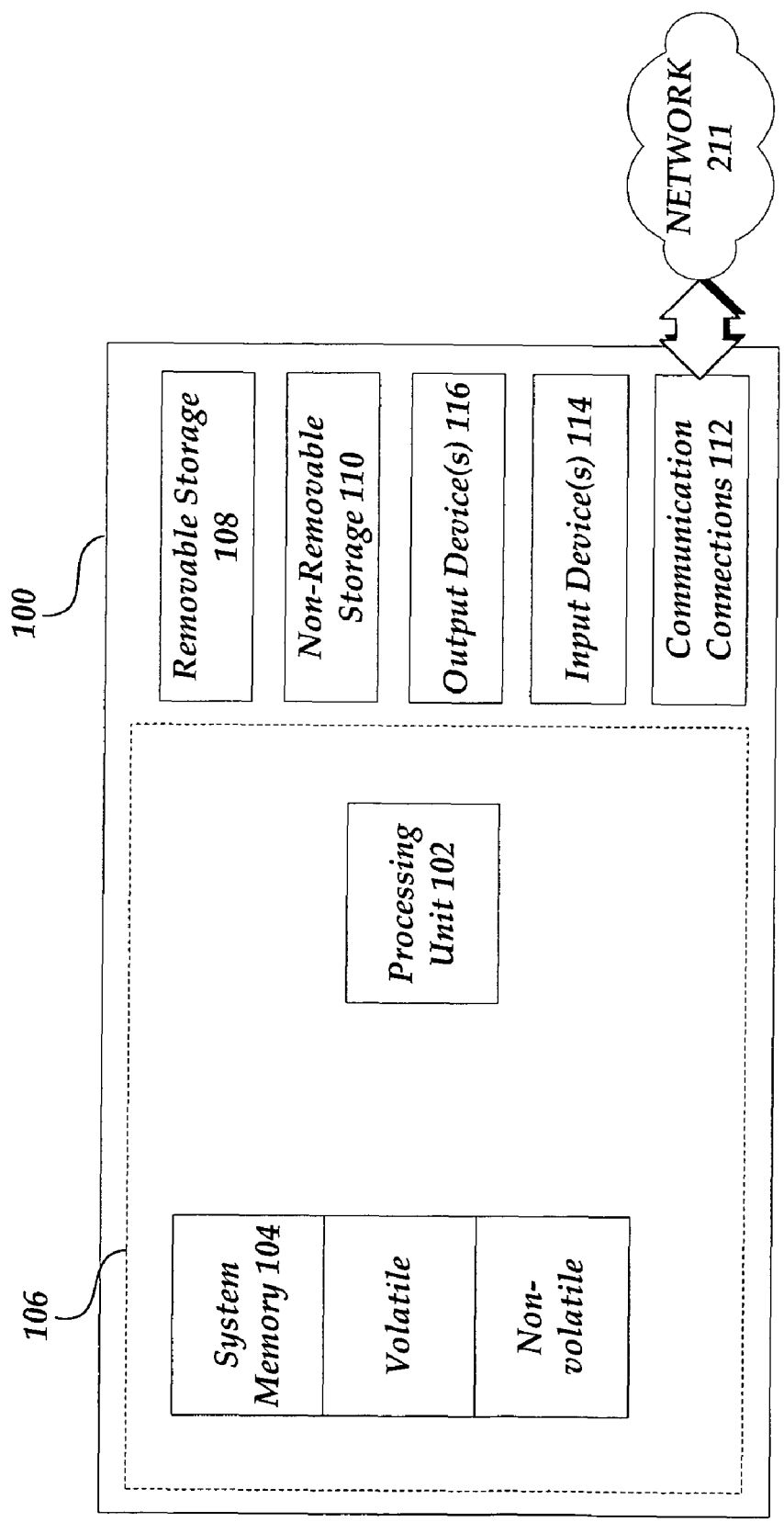
FIG. 1 is a schematic diagram of an example computing system for implementing a node of a peer-to-peer network.

FIG. 1 and the following discussion are intended to provide a brief, general description of a suitable computing environment in which a node of a peer-to-peer network storage system may be implemented. The operating environment of FIG. 1 is only one example of a suitable operating environment and is not intended to suggest any limitation as to the scope of use or functionality of the operating environment. Other well known computing systems, environments, and/or configurations that may be suitable for use as a node described herein include, but are not limited to, personal computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the peer-to-peer node and the peer-to-peer storage system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing a peer-to-peer node includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices, such as other nodes within the peer-to-peer network 211. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as display, speakers, printer, and/or any other output device may also be included.

Peer-to-Peer Networks

A peer-to-peer network is generally thought of as a self-managed network of computers in which there is no single server or controller responsible for maintaining the network. A number of different architectures are available for creating peer-to-peer networks and applications. One such architecture is an overlay network. In general, overlay networks provide a level of indirection over traditional networking addresses such as Internet Protocol (IP) addresses.

Current examples of overlay network types for peer-to-peer networks include Tapestry developed at the University of California at Berkeley by Ben Y. Zhao, et al., Chord developed at the Massachusetts Institute of Technology, and Pastry developed by Microsoft and various universities. Tapestry, Chord and Pastry are toolkits for building distributed systems. CAN, Kademlia, Skipnet, and Viceroy are other systems that are similar. New overlay designs are appearing on a frequent basis.

Figure 2:
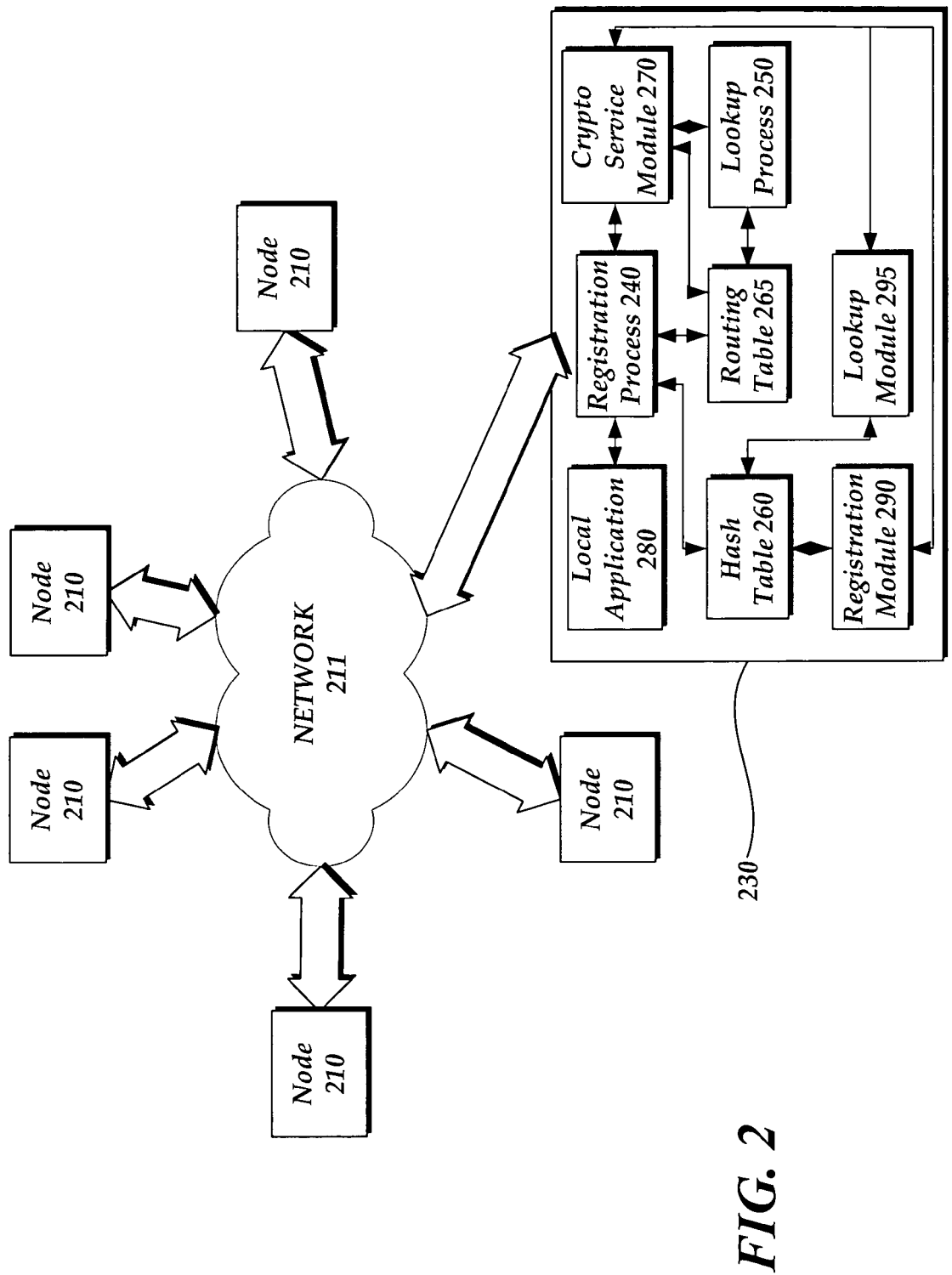
FIG. 2 is a schematic diagram of an example peer-to-peer network and example peer-to-peer network storage system

FIG. 2 illustrates a typical overlay network. Each node 210, 230 of the network may be implemented by the example computing device 100 of FIG. 1. The nodes 210, 230 that belong to the overlay network route messages between each other, using a communication medium through the underlying network medium 211. While the underlying network medium has the information and capability to directly route messages between specific computers, overlay networks typically maintain only partial routing information and rely on successive forwarding through intermediate nodes in order to deliver a message to its final intended destination.

In a peer-to-peer network, each active node of the network may be assigned a node identifier. The node identifier is a unique identifier of that active node connected to the peer-to-peer network. The node identifier may persist with the machine and/or may be for a particular session of the user. The node identifier may be any size as defined by the network protocol and the size may depend on the number of expected users of the network, the security of the system, the desire to avoid collisions, and the like. For example, the Pastry peer-to-peer network protocol defines a 128-bit node identifier, and may allow identifiers of arbitrary size. The node identifier may be assigned in any suitable manner, such as randomly assigned or the user may pick a seed which is hashed with optional other data such as date, time, and the like to form the node identifier. In one example, a persistent node identifier may be based upon a machine key certificate which is provided and/or certified by a trusted third party at the initial registration of the user with the peer-to-peer network. The assignment of nodes may be performed in any suitable manner. For example, the assignment of nodes may be performed by one or more trusted certification authorities. The certification authorities may ensure that node identifiers are chosen randomly from the node identifier space and prevent nodes from forging a node identifier. Certification authorities may be offline and not involved in normal operation of the overlay network to protect it from attacks.

To participate in the peer-to-peer network, each node may create a routing table which includes node identifiers and/or routing information of known other nodes in the peer-to-peer network. The routing table may be created in any suitable manner and in accordance with the peer-to-peer network protocol. For example, a user may query at least one known existing user in the network for a range of node identifiers, which is typically stored in the 'first row' of the routing table. The new user may then query a portion of those nodes closest to the new user's node identifier to discover additional node identifiers close and/or similar to its own node identifier. The lowest or last row of the routing table may contain node identifiers closest to the node identifier of the user node storing the routing table, e.g., the neighbors of the user node in the peer-to-peer network. In this manner, the lowest row of the routing table may form a leaf set of node identifiers closest to the user node's node identifier. Returning user nodes to the peer-to-peer network may update and/or verify entries in a persistent routing table. It is to be appreciated that the routing table for each node need not be complete, e.g., the routing table may be a partial routing table. For example, node identifiers may not be found or not exist to completely fill the routing table.

Overlay networks may be used to store and/or communicate various information. For example, a peer-to-peer network may provide a name to address resolution (e.g., peer name resolution protocol (PNRP)), data files such as a distributed database, cryptography keys, rich presence data, and the like. The data may be registered as a payload of a registration message and stored to a distributed hash table of one or more storage nodes which are members of the peer-to-peer network. Since storage of the entire hash table is distributed among the various nodes of the peer-to-per network, no single node stores the entire hash table. Rather, various storage nodes may store various portions of the hash table.

To store the payload data, the hash table associates a registration key with a value. The value contains and/or represents the payload. In this manner, each portion of the hash table stored by a node stores a key-value pair. Each registration key may be a hash of a key identifier associated with the payload contained in and/or represented by the value. For example, the key identifier may be a unique, personal identifier of a user of the peer-to-peer network, an identifier of a file or other data included in the payload, and the like. In an example instant messenger application, the key identifier may include a username, Internet protocol address, a public or private key, and/or an application indicator. In this manner, collisions of registration keys may be reduced. If a collision occurs, the value associated with the registration key may be used to differentiate the registration keys from one another. The hash of the key identifier forming the registration key may be based using any suitable hashing algorithm (e.g., an MD5 hash). With reference to FIG. 2, one or more crypto service modules 270 may provide encryption, decryption, hashing, and the like services to the node of the peer-to-peer network.

The hash of the key identifier, i.e., the registration key, identifies which node of the peer-to-peer network stores the payload associated with the registration key. In one example, the node identifier may be associated with a number space of a registration key. For example, if node identifiers are number 1 . . . 8, the each of the nodes may be assigned one eighth of the number space of the registration key. In another example, the registration key of a key-value pair and the node identifiers may have the same byte size and have the same base, e.g., base 10, base 16, base 5, and the like. The user node with a node identifier closest to the registration key of a payload may be selected to store the payload. To avoid single point failures, e.g., only one node storing the payload, the key-value pair may be replicated and stored at a multiple storage nodes with node identifiers similar to that of the registration key. In this manner, replication may leverage at least a portion of the leaf set of the routing table of the storage node. The replication factor may depend on the average time a user node stays within the peer-to-peer cloud, the probability of a user node leaving the cloud, desired reliability of the information, and the like.

To register a payload, a user node may construct a registration message. To construct the registration message, the user node may implement computer executable instructions of a peer-to-peer network storage system, an example of which is illustrated in node 230 of FIG. 2. The user node may access a registration process 240, such as a registration application interface (API), to construct and send the registration message using communication media. The user node, such as through the registration API, may determine the registration key to be associated with the payload. As noted above, the key of the key-value pair is a hash of a well-known identifier such as a string made up of a personal identifier and/or application data. The user node, such as through a local application 280 and/or a registration process 240, may use any suitable method to prepare the payload as a value of the key-value pair. For example, in an instant messenger application, the payload may include a user's friendly name, the user's current endpoint address, and/or presence data from the local application. To determine which node 210 of the peer-to-peer network 200 will store the payload, the user node may send the registration message through the cloud 211 using communication media to the node indicated in its routing table 265 as having a node identifier closest to the key for the associated payload. That node may route the registration message to another node having a node identifier more similar to the key of the key-value pair. This process may be iterated under the peer-to-peer network protocol until the key-value pair is stored in the hash table portion 260 at a storage node with a node identifier closest to the registration key of the registration message.

For example, a receiving node may receive the registration message using a registration module 290. The registration module may parse the registration request to retrieve the registration key and compare it to its own assigned node identifier. If the registration key is identical to or similar to (e.g., in its leaf set of its routing table), the receiving node may store the key-value pair parsed from the registration message.

The overlay network maintains enough information in its routing tables to be able to tell when a node's ID is closer to a key than any other node's ID. That closest node is then responsible for storing the document in its hash table 260 and responding to queries for the indicated key-value pair. As noted above, the registration message may be replicated and stored in the distributed hash table according to the network protocol at additional nodes.

In a typical peer-to-peer network, any user of the peer-to-peer network may request a lookup of a key and its associated value. In this manner, the value of a key-value pair may be accessed by anyone in a typical peer-to-peer network. Information security of the value of the stored key-value pairs may be controlled by controlling entry to the peer-to-peer network, verifying authenticity of a user's routing table when routing a message, and the like. If a node 'misbehaves', e.g., misuses information, refuses to provide information stored in its hash table, and/or refuses to forward messages to other node members, the node identifier of that node may be revoked. However, once within a typical peer-to-peer network network, all information may be retrieved by any node.

In some cases, the user who registered the key-value pair may not desire all users or even a portion of the users of the peer-to-peer network to have access to and/or retrieve the key-value pair. For example, in an instant messenger application, a user may not desire his boss to find out that he is on-line and playing a video game or surfing the Internet. In a peer-to-peer network, there is no central server to authenticate a requesting user and/or deter attacks on the network to provide security, privacy and the like to the information of the key-value pair.

Peer-to-Peer Network Security

The storage and/or retrieval of a registered key-value pair in the distributed hash table may be limited. In one example, the value of the key-value pair may be encrypted to protect that information. Another user querying the key-value (e.g., hash of a key identifier) may retrieve the value, even if he is not able to decrypt that information. However, the mere fact that the querying user retrieved some data, even if it is encrypted, may provide information, and thus violate privacy or other security concerns. For example, in an instant messenger context, the key-value pair may not be registered unless the identified user is on-line. Accordingly, the querying user receiving any value even if encrypted may determine that another user is on-line.

Figure 3:
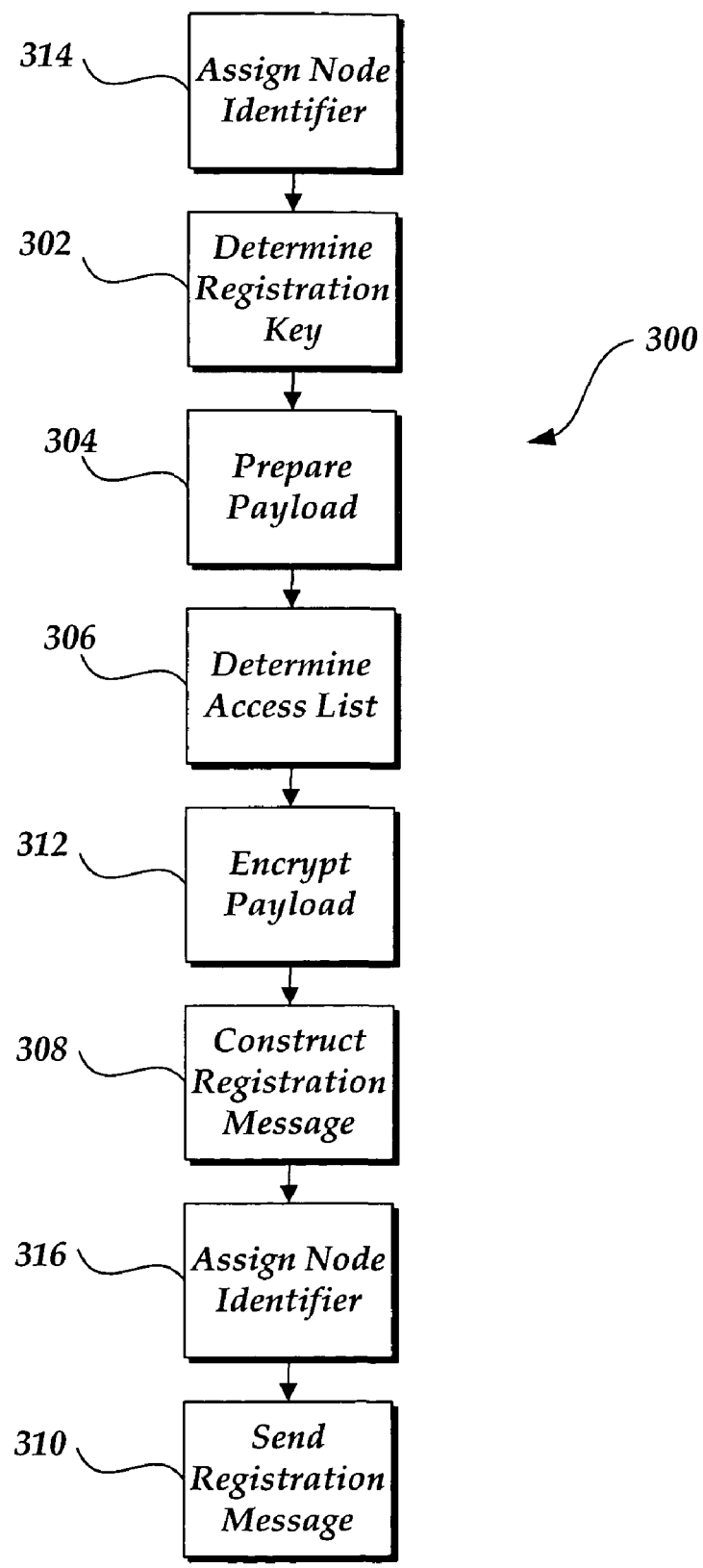
FIG. 3 is a flow chart of an example method of registering data in a peer-to-peer network.

To control access to information and/or protect information that is stored within a hash table of a peer-to-peer network, the registration message described above may be modified. FIG. 3 illustrates an example method 300 of registering information to be stored in a distributed hash table such as that of a peer-to-peer network.

A user may join the peer-to-peer network in any suitable manner. For example, the user may be assigned 314 a node identifier in accordance with the network protocol. The user may determine 302 the registration key to be associated with the payload, such as through a registration process 240 of FIG. 2. As noted above, the registration key of the key-value pair is a hash of a known key identifier such as a string made up of a personal identifier and/or application data. The user, such as through a local application and/or registration process, may then use any suitable method to prepare 304 the payload as a portion of the value of the key-value pair. As noted above, the payload may be any information to be associated with the registration key, e.g., rich presence data, a storage file, and/or communication address, and the like.

To limit access to the payload information, the user node may determine 306 an access list. The access list of the registration message may be constructed through the registration process 240 and/or the local application 280 of FIG. 2. The access list may include one or more suitable retrieval identifiers associated with those users that the registering user wants to have rights to retrieve the payload information. In an instant messenger example, the access list may include retrieval identifiers associated with the registering node's 230 instant messenger contact list. In a data storage example, the access list may include retrieval identifiers of users allowed access to the file being registered. The retrieval identifiers of the access list may be any suitable identifier that may be validated to allow access to the payload information. The retrieval identifiers of the access list may be unencrypted identifiers or alternatively may be encryptions or hashes of an identifier of a user. For example, the retrieval identifier of a user may be a personal identifier, e.g., IP address, of the user node within the peer-to-peer network. In another example, the retrieval identifier of a user may be a hash of a public or private key of a public/private key pair of the user having rights to retrieve.

The registering user may construct 308 the registration message, such as through the registration process 240 of FIG. 2. The registration message may be constructed from the determined registration key, a value including the payload, and the access list. In another example, the value of the key-value pair may be formed from a combination or concatenation of the payload and the access list. The registering node may send 310 the registration message to the appropriate node(s) using communication media according to the network protocol of the peer-to-peer network.

The node receiving the registration message may be assigned 316 a node identifier in accordance with the network protocol. The receiving node may receive the registration message such as using a registration module 290 of FIG. 2. The registration module may parse the registration message to retrieve the registration key and compare its assigned node identifier with the registration key of the registration message to determine if it must store the key-value pair. If the receiving node's assigned node identifier is closest to the registration key of the registration message or if the registration key is in the receiving node's leaf set of its routing table, the receiving node may store the key-value pair in its hash table and become a storage node for that key-value pair. Referring to the example of FIG. 2, the registration module 290 of the receiving node may send the key-value pair parsed from the registration message to the hash table 260 for storage.

The hash table storing the registered key-value pair, such as hash table 260 of node 230 of FIG. 2, may be stored in any suitable data store in the memory of the storage node. It is to be appreciated that any suitable data store in any suitable format may be used to store and/or communicate the hash table information to retrieving nodes, including a relational database, object-oriented database, unstructured database, an in-memory database, sequential memory, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computer.

From time to time, other nodes of the peer-to-peer network may desire to retrieve and/or access the payload information stored in the hash table as a key-value pair. To retrieve the payload information, the retrieving user node may construct a lookup message and direct the lookup message to the storage node. The lookup message may be constructed through a lookup process 250 of node 230 of FIG. 2, such as a lookup API.

Figure 4:
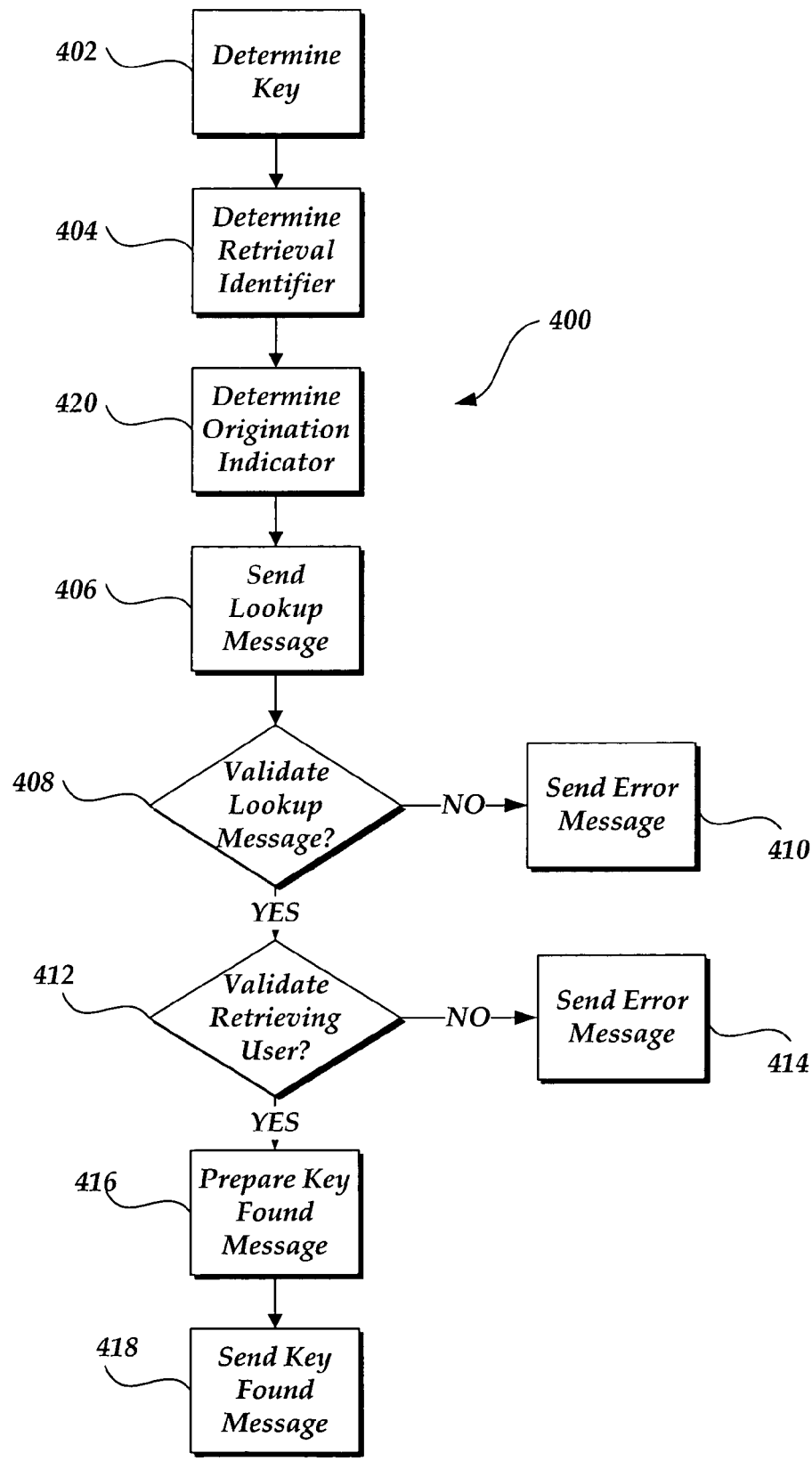
FIG. 4 is a flow chart of an example method of retrieving data in a peer-to-peer network.

FIG. 4 illustrates an example method 400 of retrieving the stored information from the peer-to-peer network using a lookup message. To retrieve the stored data from the peer-to-peer network, a retrieving user node may determine 402 the appropriate registration key for the desired information. Similar to determining the registration key of the registration message, the retrieving user node preparing the lookup message may determine the appropriate key identifier for the stored information, such as by using the lookup process 250 and/or a local application 280 of FIG. 2. The key identifier may include the personal identifier and application information of the registering user. The key identifier may be hashed to form the registration key. For example, the key identifier may be hashed by using the lookup process 250 and/or a crypto service module 270 of FIG. 2.

The retrieving user node may then determine 404 the retrieval identifier of the retrieving node. As noted above, the retrieval identifier may be any suitable identifier of the user authorized to access the stored key-value pair. For example, in a PKI system, the retrieval identifier may be the retrieving user's public key. With reference to FIG. 2, the retrieving node may use the lookup process 250 and/or crypto service module 270 to form the retrieval identifier.

The retrieving user node may construct the lookup message to include the registration key and retrieval identifier. The retrieving node may send 406 the lookup message to the appropriate node of the peer-to-peer network, e.g., the node having a node identifier closest to the key of the lookup message. For example, with reference to FIG. 2, the lookup process 250 may access the routing table 265 to determine the known node identifier closest to the determined registration key and send the lookup message using communication media through the network cloud 211 to that node.

A receiving node may receive the lookup message and parse the lookup message using any suitable process, such as a lookup module 295 of FIG. 2, to retrieve the registration key. Referring to FIG. 4, the receiving node, such as through the lookup module 295 of FIG. 2, may validate 408 the lookup message. For example, the receiving node may determine if the registration key provided in the look-up message is an exact match for any stored registration keys in the hash table of the receiving node. If there is no such key registered at that node, the node may return 410 an error message to the retrieving user node. The error message may be any suitable error message such as "no such key" or "request denied".

If the parsed registration key exists at the receiving node, the receiving node may validate 412 the retrieving user. The retrieving user may be validated in any appropriate manner. For example, the receiving node may retrieve the retrieval identifier in the lookup message such as by parsing the lookup message using the lookup module 295. The receiving node may compare the retrieval identifier of the lookup message with the one or more retrieval identifiers listed in the access list of the indicated key-value pair. If the retrieval identifier from the lookup message is not hashed, e.g., the IP address or public key of the retrieving user, the receiving node may hash the retrieval identifier before comparing with the access list. If the indicated retrieval identifier of the lookup message does not match any retrieval identifier of the access list, the receiving node may return 414 an error message. The error message may be the same as or different from the error message returned 410. If the error message is the same, the retrieving node may not be able to determine if there is a key-value pair registered, even if denied access to the registered key-value pair.

If the user is validated, then the receiving node may prepare 416 a key found message which may include the row from the hash table which matches the registration key and the message payload. In accordance with network protocol and/or access list privileges, the access list itself may or may not be returned to the retrieving user with the payload. The key found message may be constructed using any suitable process such as the lookup module 295 of FIG. 2 and/or a key found process (not shown) which may be a key found API. The receiving node may then send 418 the key found message to the retrieving node using communication media.

Additional verification of the retrieving user node may also be implemented. For example, the lookup message constructed by the retrieving node may also include an origination proof indicator. The origination proof indicator may indicate that the retrieving node originated the lookup message. The origination indicator may be any suitable indicator which may be verified to indicate which node originated the message. With reference to the method of retrieving of FIG. 4, the retrieving node may determine 420 the origination indicator through any suitable process such as through the lookup process 250 of FIG. 2. For example, the retrieving node may determine the origination indicator by signing a text string such as the current universal time indicator with the private key of the retrieving user. As noted above, one or more crypto service modules, for example crypto service module 270 of FIG. 2, may provide encryption services to the retrieving node of the peer-to-peer network. The origination indicator may be added to the lookup message to be sent 406 to the receiving node.

When validating 412 the retrieving user, the receiving node may validate the origination indicator using any appropriate process, such as by using a lookup module 295 of FIG. 2. In one example, the receiving node may validate a signature of the origination indictor with the public key of the retrieving user. Signature services may be provided through a crypto service module 270 shown in FIG. 2. The public key may be parsed from the lookup message or may be retrieved from a suitable key retrieval system. For example, the retrieval key may be the public key of the retrieving user node. In this manner, the parsed retrieval key may be used to validate the origination indicator of the lookup message. If the origination indicator cannot be validated by the receiving node, the receiving node may return an error message 414, which may be the same as or different from the error message returned 410. In some cases, validation of the origination signature may be more processor intensive than validation of the retrieving identifier. Accordingly, the origination indicator may be validated after the retrieval identifier is validated.

To further verify the origination indicator, the receiving node may examine the contents of the origination indicator, e.g., the contents which were signed may provide additional validation criteria. For example, the origination indicator may include a universal time and a signature of the universal time. The receiving node, such as through the lookup module 295 of FIG. 2, may compare a validation threshold with the difference between the parsed universal time with the current time. If the difference in time exceeds the threshold, e.g., the message is timed-out, the receiving node may return an error message 414, which may be the same as or different from the returned 410 error message. If the origination indicator is validated, the receiving node may continue to prepare 416 the key found message as noted above.

In some cases, e.g., in a trusted domain, an unencrypted payload of a stored key-value pair may be sufficiently secure. More particularly, the storage node(s) storing the unencrypted payload information may be considered a low enough risk to the data. For example, in a large network with many users, the likelihood that an attacker is selected as a storage node for a particular piece of data may be fairly small. In this manner, protection of the unencrypted payload information may rely in part upon the disinterest of the storage node in the payload information stored in its portion of the hash table.

In some cases, the payload information may be encrypted to provide protection against unauthorized access, e.g., either by the storage node and/or an attacker. With reference to the method 300 of FIG. 3, the registering node may encrypt 312 the payload. To encrypt the payload, the registering node may use any suitable encryption technique appropriate to encrypt and allow decryption of the payload, including without limitation a symmetric encryption key, an asymmetric encryption key, one of a public/private key pair, and the like. As noted above, encryption services may be provided by one or more cypto service modules 270, as shown in FIG. 2.

Figure 5:
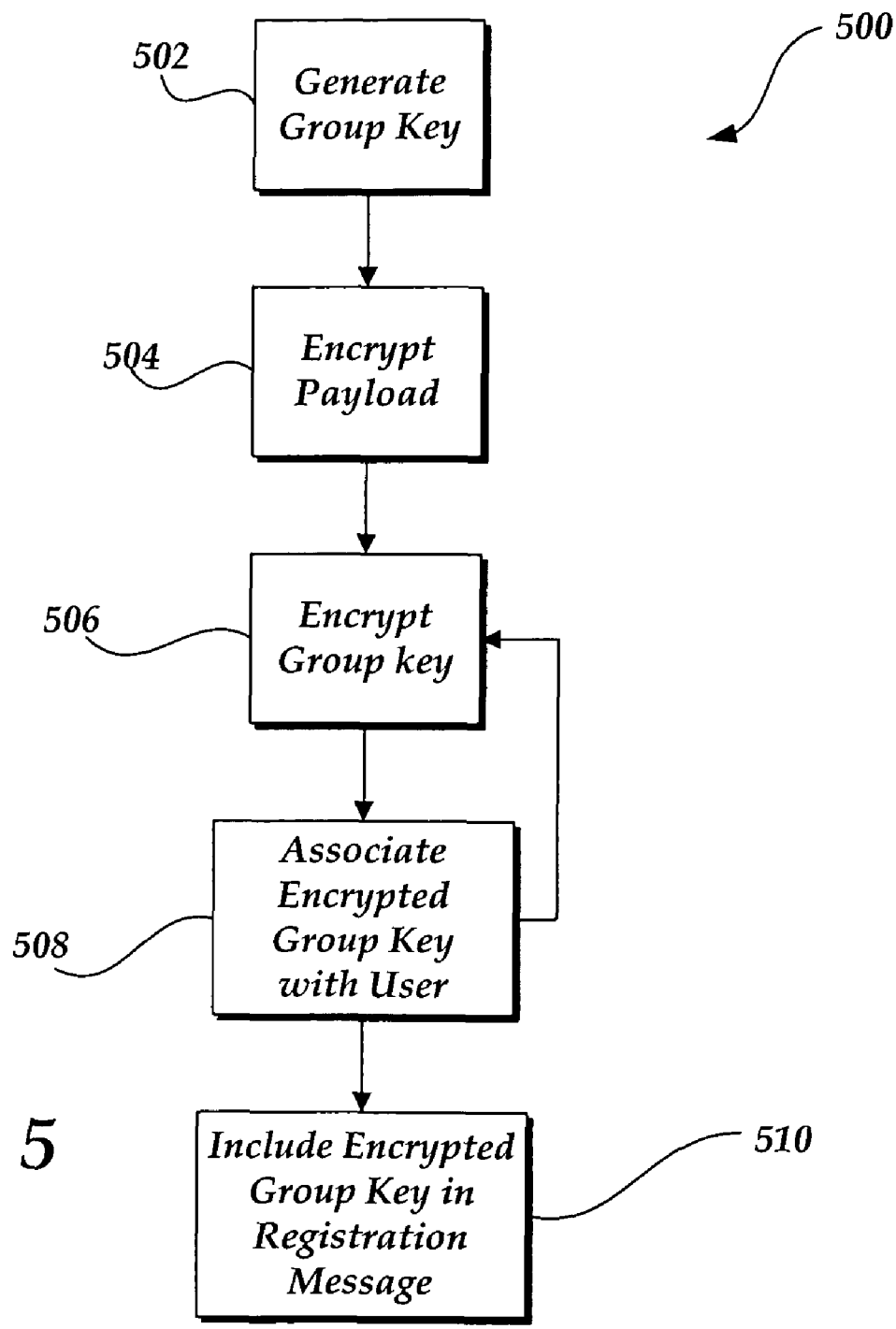
FIG. 5 is a flow chart of an example method of encrypting a payload of registering data of FIG. 3.

One example method of encrypting 312 the payload is shown in FIG. 5. The registering node may generate 502 a group key, which may be any suitable encryption key which may be random or predetermined, symmetric or asymmetric, and the like. The registering node may then encrypt 504 the payload with the generated group key.

To ensure that the retrieving user identified in the access list may decrypt the payload, the registering node may include the group key in the registration message. The group key may be included in the registration message in any suitable manner including as a portion of the value of the key-value pair stored at the storage node of the peer-to-peer network. However, including the group key in the same storage location (e.g., key-value pair) as the encrypted payload may increase the risk above tolerable levels. More particularly, encryption of the payload may not be secure if stored in combination with the group key which may be used to decrypt the payload.

To protect the group key, the registering user may encrypt 506 the group key using any suitable encryption technique and any suitable encryption key. With reference to FIG. 2, a crypto service module 270 may be used to encrypt the group key. In one example, the group key may be encrypted using the personal public key of a user identified in the access list. That encrypted group key may then be associated 508 with the retrieval identifier of that user included in the access list. If more than one user is identified in the access list, then the method may return to encrypting 506 the group key with the public key of each user identified in the list and associating the encrypted group key with each respective user. Each encrypted group key may be included 510 in the registration message associated with its respective user in the access list.

Figure 6:
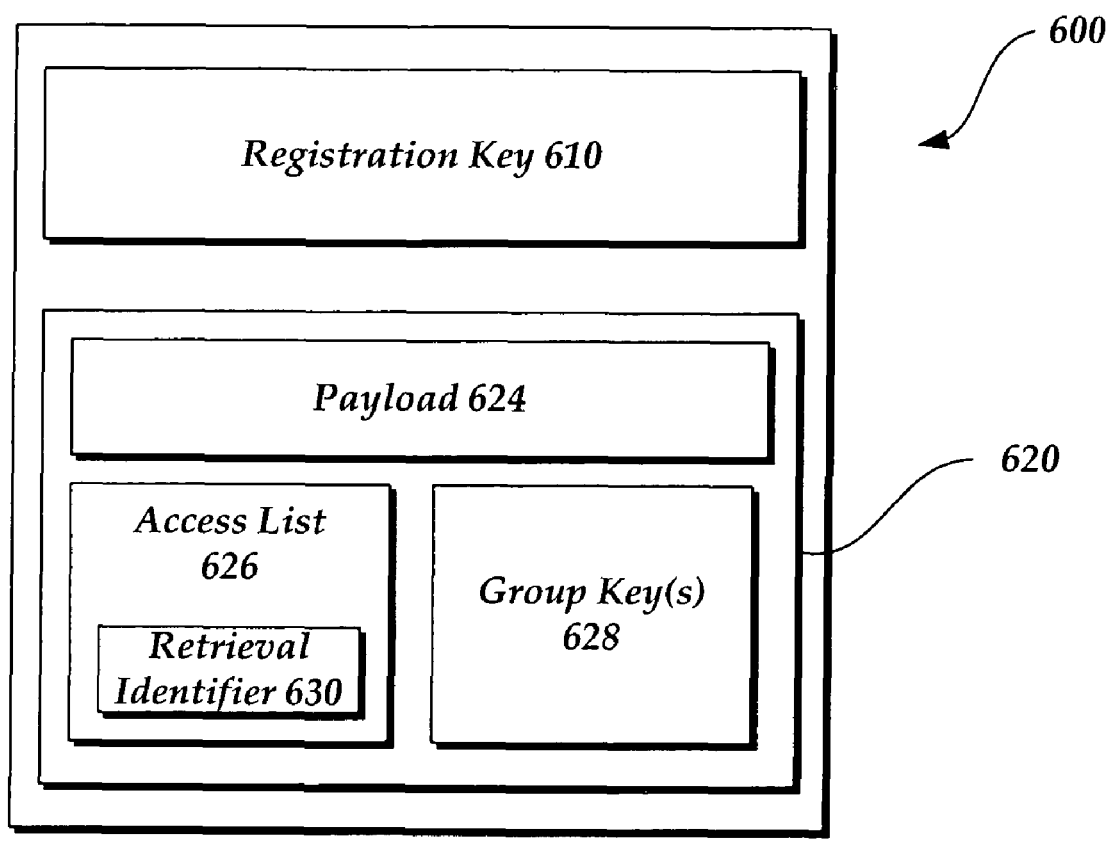
FIG. 6 is a schematic diagram of an example registration message in a peer-to-peer network.

A peer-to-peer network supporting an instant messenger application illustrates one example of registering and retrieving information in a peer-to-peer network. In accordance with the protocol of the peer-to-peer network, each active node is assigned a node identifier. An entering user, for example Jane Doe, may register her registration identifier with the peer-to-peer network to make her communication address and/or rich presence data available. The node of Jane Doe may construct a registration message. An example schematic diagram of a portion of a registration message 600 is illustrated in FIG. 6. The registration message 600 may include a registration key 610 which is associated with a value 620. The registration key 610 in the instant messenger example may be formed as a hash of a personal identifier such as an internet e-mail address and application data such as an indication of 'on-line'. In this manner, the registration key 610 of Jane Doe may be represented as SHA(jane.doe@microsoft.com-online). The value 620 may be a combination of one or more parts including a payload 624, an access list 626, and/or one or more group keys 628.

The payload portion 624 of the value may be accessed from the local application, e.g., the instant messenger local application. The payload 624 in an instant messenger example may include a friendly name (e.g., Jane Doe—GI Jane!), a current activity indicator (e.g., playing Quake), and/or Jane Doe's current messenger end point such as an IP address (e.g., 1.2.3.4.5030).

To limit access to the payload data from nodes which may store the key-value pair and/or other unauthorized nodes, Jane's node may generate a group key (GK) 628 and encrypt the payload data with the group key. The encrypted payload data may be represented as {GK}(Jane Doe—GI Jane, 'playing Quake', 1.2.3.4.5030).

To limit access to the payload data to be stored in the peer-to-peer network, Jane Doe may form an access list 626 of one or more users of the peer-to-peer network members which may access her payload data. Users authorized to access the key-value pair may be identifier by a retrieval identifier 630. For example, Jane may wish her mother Joan Doe and husband John Doe to have access to her payload data, e.g., contact and/or presence data in the instant messenger application. Accordingly, Jane may generate an access list including a retrieval identifier for Joan Doe and a retrieval identifier for John Doe.

Figure 7:
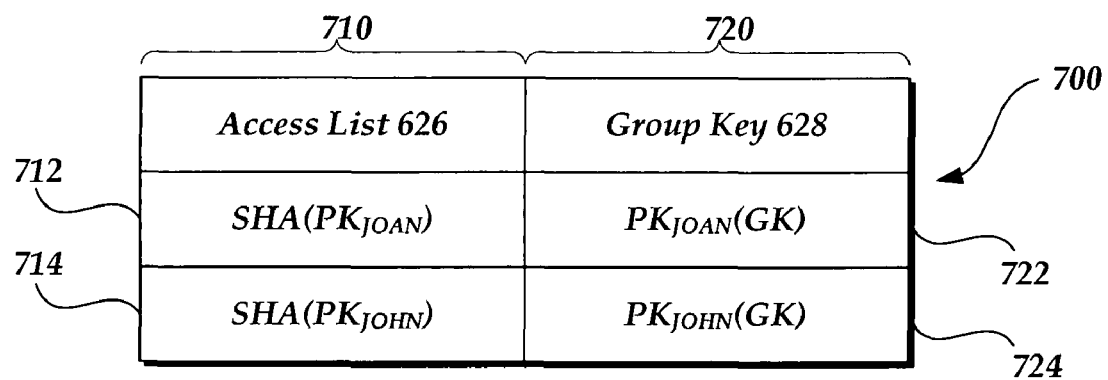
FIG. 7 is a diagram of a table of an example access list of FIG. 6.

A diagram of a table of an example access list 626 with group key(s) 628 is illustrated in FIG. 7. In the example table of 626 of FIG. 7, the access list table may have two columns 710, 720. The first column 710 may include a retrieval identifier which may be a hash of an identifier of the node and/or person authorized to access the key-value pair being registered. In the illustrated example, the first column 710 may contain a hash of the personal identifier of Joan Doe 712 and a hash of the personal identifier of John Doe 714. More particularly, the retrieval identifier for Joan and John Doe respectively may be the hash of the public key PK of the that respective user, e.g., SHA($PK_{Joan}$) and SHA($PK_{John}$). The second column 720 of the table 700 may contain the encrypted group key GK 628 of FIG. 6 which may be encrypted with the public key of the associated user. In the example shown in FIG. 7, the group key 722 may be the group key 628 encrypted with Jane's public key $PK_{Joan}$, and group key 724 may be group key 628 encrypted with John's public key $PK_{John}$. In this manner, the encrypted group key 722 may be associated with retrieval identifier 712; and similarly, encrypted group key 724 may be associated with retrieval identifier 714.

Jane may then register the key-value pair with the peer-to-peer network. More particularly, the message may be routed to and stored at the node of the peer-to-peer network having an assigned node identifier which is closest to the registration key of the key-value pair. The key-value pair may also be replicated and stored at additional nodes neighboring or similar to that of the registration key of the key-value pair, e.g., the leaf set of the storage node.

Figure 8:
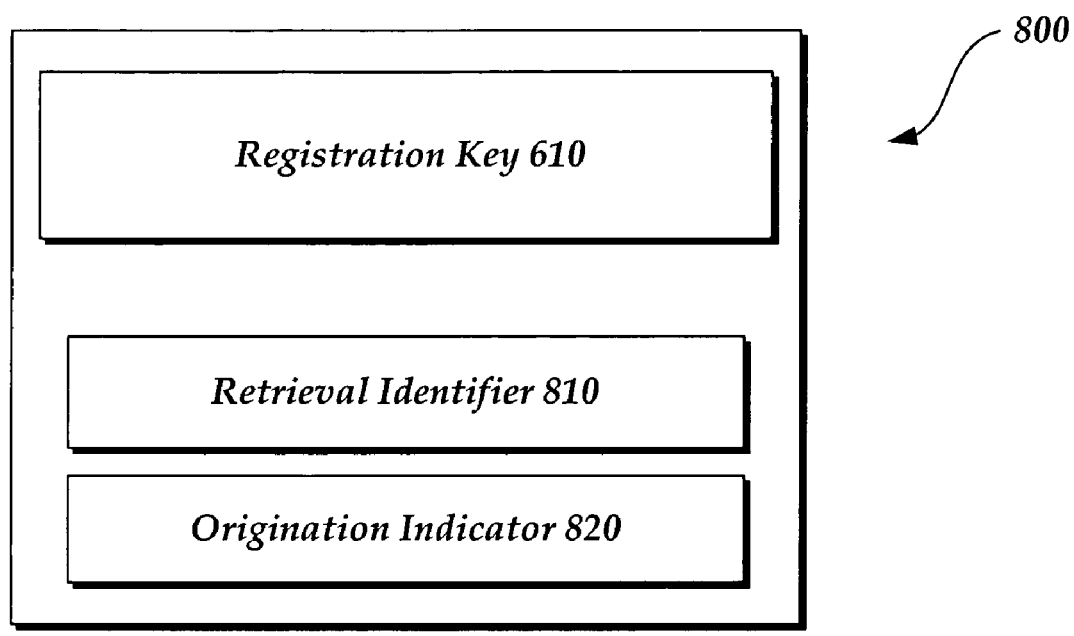
FIG. 8 is a schematic diagram of an example lookup message in a peer-to-peer network.

To send Jane an instant message, a user may generate a lookup message to determine Jane's contact information and/ or status within the peer-to-peer network. FIG. 8 illustrates a schematic diagram of an example lookup message 800. The user may specify the registration key 610 used to register the value 620. More particularly, the user may specify the hash of the user identifier and application data (e.g., SHA (jane.doe@microsoft.com-online)). The user may also provide a retrieval identifier 810. For example, if Joan Doe is constructing the lookup message 800, the retrieval identifier may be a hash of her public key, e.g., SHA($PK_{Joan}$). In another example, the retrieval identifier 810 provided by the retrieving user may be their public key, which is not hashed. The retrieving user may also provide an origination indicator 820. For example, the origination indicator may be the universal time encrypted with Joan's private key, e.g., $PV_{Joan}$ (universal time). The user may forward the lookup message through the peer-to-peer network cloud to the node with a node identifier closest to the indicated registration key.

The receiving node may parse and examine the registration key 610 to determine if that key is registered at that node. If not, then the receiving node may send an error message. If the registration key is found, the receiving node may compare the retrieval identifier 810 with the access list 626 of FIG. 6 of the stored key-value pair. If the retrieval identifier 810 is not hashed and the retrieval identifiers in the access list are hashed, then the receiving node may hash the retrieval identifier 810 before comparing with the access list. If the retrieval identifier 810 is not present in the access list 626, the receiving node may send an error message.

If the retrieval identifier is present, the receiving node may validate the origination indicator of the lookup message. More particularly, the receiving node may use the public key of the retrieving user to verify the signature of the origination indicator 820. As noted above, the origination indicator may be signed with the private key of the retrieving user. The public key of the retrieving user, to verify the signature, may be retrieved using any suitable process, such as from the lookup message, the retrieving user, or a third party. The contents signed by the private key may be verified as a valid universal time. Moreover, the provided universal time may be validated as not exceeding a time boundary threshold for a lookup message. If the origination indicator is not valid, the receiving node may send an error message. If the origination indictor is valid the receiving node may construct a key found message including the registration key 610, the encrypted payload 624, and the encrypted group key 628 associated with the provided retrieval identifier. The retrieving user, here Joan Doe, may receive the key found message and parse the encrypted payload and encrypted group key. Joan Doe's node may use her private key ($PV_{Joan}$) to decrypt the group key 628 (which in the example above was encrypted using the public key of Joan (e.g., $PK_{Joan}$). Joan's node may then use the group key 628 to decrypt the payload 624 to reveal the payload, e.g., determine the contact information and presence data of her daughter Jane.

From time to time, a registering user may modify the access list of a key-value pair. Any suitable method may be used to modify the access list. For example, the registering user may de-register the key-value pair and re-register the key-value pair with an updated access list. For example, if Jane removes her mother from the access list, Joan Doe may receive an error message, such as 'key not found' when she attempts to lookup her daughter within the peer-to-peer network. Requests to de-register a key-value pair may be access limited. For example, only the registering user node may de-register a key-value pair. In another example, a user identified in the access list may be authorized to de-register the key-value pair. The de-registration access list may be the same as or different from the retrieval access list discussed above.

The above methods for registering and retrieving data in a peer-to-peer network provide some level of security of information. The users who are aware of the access list for a key-value pair are the registering node and the storage node(s). Since the access list may contain public keys and not contact information, the identity of those having access may be difficult to ascertain. The identities of the users granted access may also be further concealed by creating the retrieval identifier as a hash of the user identifiers.

The probability that an attacker is selected as a storage node to store the registered key-value pair may be small, particularly in fairly large networks. For example, log(N) nodes may receive a registration message as it is routed to the storage node, where N is the number of nodes in the peer-to-peer network. A number k nodes may store the registration of the key-value pair, where k is one or more depending on the replication factor of the peer-to-peer network. In this manner, the chance that an attacker receives the registration for storage is (log(N)+k)/N. In the case where the number of nodes is 5,000,000 users, the base is 10, and the registration is replicated among 4 nodes, then the probability of an attacker receiving the registration (and hence knowing that the registering user is on-line) is roughly 0.00003.

A storage node may provide an undirected attack by publishing the key-value pairs stored in its portion of the hash table. Even though the storage node may not be interested in any of the stored data, publishing the key-value pairs may enable other attackers to retrieve them, thus, creating an indirect attack of the stored data and/or the registering user. The above described methods may reduce the effect of the undirected attack by encrypting the payload information. Specifically, the undirected attacker may be able to determine if a registered user is on-line by the mere existence of a registration, however, the contact information and other rich presence data may be encrypted with the group key to protect the privacy of the registering user. In addition, undirected attacks may be deterred by authentication of users within the peer-to-peer network. If a node is violating the rules of conduct of the network (e.g., publishing the key-value pairs), the node's credentials to participate in the peer-to-peer network may be revoked. Attacks may also be deterred by providing a new identity, e.g., node identifier and/or personal identifier, to the user node who has been attacked or whose information has lost integrity.

The above described storage system may be modified to allow access of a privileged party to all or a portion of the key-value pairs of the hash table. More particularly, a privileged party may be granted access to all or a portion of the key-value pairs. In one example, the identifier of a privileged party may always be validated by the storage node as a valid user having access to the requested key-value pair. For example, the receiving node may compare the provided retrieval identifier with the access list associated with the registered key-value pair as well as with a network privileged party access list including retrieval identifiers of privileged parties who have access to all key-value pairs. In another example, the privileged party identifier may be added to all or at least a portion of the access lists of the key-value pairs registered in the peer-to-peer network. For example, the privileged party retrieval identifier may be automatically added to each access list registered with the peer-to-peer network. In one example, the registering user may be automatically added to the access list for any message registered by that user.

If an access list contains no retrieval identifier (e.g., no authorized users are provided by the registering user), the peer-to-peer storage system may take any appropriate default action. For example, if no access list is provided, all retrieving users may be valid to retrieve the associated stored key-value pair. Alternatively, if no access list is provided, only the registering user and/or privileged party may be validated as a valid user to retrieve the stored key-value pair.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples, and data provide a complete description of the structure and use of exemplary embodiments of the invention. Since many embodiments of the invention can be made without departing from the spirit and scope of the invention, the invention resides in the claims hereinafter appended.

The embodiments of the invention in which an exclusive property or privilege is claimed are defined as follows:

1. A method of limiting access to a key-value pair by devices implementing a peer-to-peer network, the method comprising:
   determining a registration key that uniquely identifies a first device relative to the peer-to-peer network, wherein the first device is one of the devices implementing the peer-to-peer network;
   generating a group key;
   preparing an access list that comprises one or more retrieval identifiers, wherein each retrieval identifier uniquely identifies an authorized device relative to the peer-to-peer network, and wherein each authorized device is one of the devices implementing the peer-to-peer network, and wherein each retrieval identifier in the access list indicates that the corresponding authorized device is authorized by the first device to retrieve the key-value pair, and wherein the access list further comprises each retrieval identifier paired with the group key, and wherein in each pairing of the group key with one of the retrieval identifiers, the paired group key is encrypted with a public key of the authorized device identified by the corresponding retrieval identifier;
   encrypting a payload with the group key;
   forming the key-value pair using the registration key and a value comprising the encrypted payload and the access list;
   constructing a registration message comprising the key-value pair;
   registering the key-value pair with the peer-to-peer network; and
   wherein the method is performed by one of the devices implementing the peer-to-peer network.

2. The method of claim 1, wherein the registration key is a hash of an email address string corresponding to a user of the first device.

3. The method of claim 1, wherein each of the one or more retrieval identifiers in the access list is a hash of the public key of the authorized device identified by the corresponding retrieval identifier.

4. The method of claim 1, wherein the payload comprises information related to a user of the first device and pertaining to instant messaging.

5. The method of claim 1, wherein the payload comprises a file.

6. The method of claim 1, further comprising:
   de-registering the key-value pair with the peer-to-peer network;
   modifying the access list of the de-registered key-value pair; and
   re-registering the modified key-value pair with the peer-to-peer network wherein the re-registered key-value pair comprises the modified access list instead of the access list.

7. The method of claim 1, wherein each retrieval identifier in the access list is hashed.

8. A method of limiting access to a key-value pair by devices implementing a peer-to-peer network, the method comprising:
   storing, on a storage device that is one of the devices implementing the peer-to-peer network, a registration message comprising the key-value pair wherein the key-value pair comprises an associated registration key and a value that comprises an encrypted payload and an access list, and wherein the associated registration key uniquely identifies a first device relative to the peer-to-peer network, and wherein the first device is one of the devices implementing the peer-to-peer network, and wherein the encrypted payload comprises a payload encrypted by the first device using a group key generated by the first device, and wherein the access list comprises one or more retrieval identifiers, wherein each retrieval identifier uniquely identifies an authorized device relative to the peer-to-peer network, and wherein each authorized device is one of the devices implementing the peer-to-peer network, and wherein each retrieval identifier in the access list indicates that the corresponding authorized device is authorized by the first device to retrieve the key-value pair, and wherein the access list further comprises each retrieval identifier paired with the group key, and wherein in each pairing of the group key with one of the retrieval identifiers, the paired group key is encrypted with a public key of the authorized device identified by the corresponding retrieval identifier;
   receiving a lookup message from a retrieving device, wherein the retrieving device is one of the devices implementing the peer-to-peer network, and wherein the lookup message comprises a retrieval identifier that uniquely identifies the retrieval device relative to the peer-to-peer network, and wherein the lookup message comprises a registration key; and
   determining if the registration key matches the associated registration key and, if not, then returning an error to the retrieving device, and, if so, then:
   determining if the retrieval identifier matches a retrieval identifier in the access list and, if not, then returning the error to the retrieving device wherein the error message does not reveal to the retrieving device that the retrieval key matches the associated retrieval key, and, if so, then:
   constructing a key found message comprising the encrypted payload and the encrypted group key from the access list that corresponds to the retrieval identifier and sending the key found message over the peer-to-peer network to the retrieving device.

9. The method of claim 8, wherein the constructing the key found message further comprises determining if an origination indicator comprised by the lookup message comprises universal time data within an acceptable time limit and signed by the retrieving device and, if not, then returning the error to the retrieving device wherein the error message does not reveal to the retrieving device that the retrieval key matches the associated retrieval key, and, if so, then constructing the key found message comprising the encrypted payload and the encrypted group key from the access list that corresponds to the retrieval identifier and sending the key found message over the peer-to-peer network to the retrieving device.

10. The method of claim 8, wherein the associated registration key is a hash of an email address string corresponding to a user of the first device.

11. The method of claim 8, wherein each of the one or more retrieval identifiers in the access list is a hash of the public key of the authorized device identified by the corresponding retrieval identifier.

12. The method of claim 8, wherein the payload comprises information related to a user of the first device and pertaining to instant messaging.

13. The method of claim 8, wherein the payload comprises a file.

14. The method of claim 8, wherein each retrieval identifier in the access list is hashed.

15. At least one computer-readable storage device comprising computer-executable instructions that, when executed by a device of devices implementing a peer-to-peer network, cause the device to perform a method of limiting access to a key-value pair by the devices implementing the peer-to-peer network, the method comprising:

storing, on a storage device that is one of the devices implementing the peer-to-peer network, a registration message comprising the key-value pair wherein the key-value pair comprises an associated registration key and a value that comprises an encrypted payload and an access list, an wherein the associated registration key uniquely identifies a first device relative to the peer-to-peer network, and wherein the first device is one of the devices implementing the peer-to-peer network, and wherein the encrypted payload comprises a payload previously encrypted by the first device using a group key generated by the first device, and wherein the access list comprises one or more retrieval identifiers, wherein each retrieval identifier uniquely identifies an authorized device relative to the peer-to-peer network, and wherein each authorized device is one of the devices implementing the peer-to-peer network, and wherein each retrieval identifier in the access list indicates that the corresponding authorized device is authorized by the first device to retrieve the key-value pair, and wherein the access list further comprises each retrieval identifier paired with the group key, and wherein in each pairing of the group key with one of the retrieval identifiers, the paired group key is encrypted with a public key of the authorized device identified by the corresponding retrieval identifier;

receiving a lookup message from a retrieving device, wherein the retrieving device is one of the devices implementing the peer-to-peer network, and wherein the lookup message comprises a retrieval identifier that uniquely identifies the retrieval device relative to the peer-to-peer network, and wherein the lookup message comprises a registration key; and determining if the registration key matches the associated registration key and, if not, then returning an error to the retrieving device, and, if so, then:

determining if the retrieval identifier matches a retrieval identifier in the access list and, if not, then returning the error to the retrieving device wherein the error message does not reveal to the retrieving device that the retrieval key matches the associated retrieval key, and, if so, then:

constructing a key found message comprising the encrypted payload and the encrypted group key from the access list that corresponds to the retrieval identifier and sending the key found message over the peer-to-peer network to the retrieving device.

16. The at least one computer-readable storage device of claim 8, wherein the constructing the key found message comprises determining if an origination indicator comprised by the lookup message comprises universal time data within an acceptable time limit and signed by the retrieving device and, if not, then returning the error to the retrieving device wherein the error message does not reveal to the retrieving device that the retrieval key matches the associated retrieval key, and, if so, then constructing the key found message comprising the encrypted payload and the encrypted group key from the access list that corresponds to the retrieval identifier and sending the key found message over the peer-to-peer network to the retrieving device.

17. The at least one computer-readable storage device of claim 8, wherein the associated registration key is a hash of an email address string corresponding to a user of the first device.

18. The at least one computer-readable storage device of claim 8, wherein each of the one or more retrieval identifiers in the access list is a hash of the public key of the authorized device identified by the corresponding retrieval identifier.

19. The at least one computer-readable storage device of claim 8, wherein the payload comprises information related to a user of the first device and pertaining to instant messaging.

20. The at least one computer-readable storage device of claim 8, wherein the payload comprises a file.

21. The at least one computer-readable storage device of claim 8, wherein each retrieval identifier in the access list is hashed.

* * * * *